Aug. 30, 1932.  A. DUBONNET  1,874,034
SHOCK ABSORBING SUSPENSION
Filed Dec. 15, 1930   2 Sheets-Sheet 1

André Dubonnet
Inventor
by Louis Barnett
Attorney

Aug. 30, 1932.  A. DUBONNET  1,874,034
SHOCK ABSORBING SUSPENSION
Filed Dec. 15, 1930   2 Sheets-Sheet 2

Patented Aug. 30, 1932

1,874,034

UNITED STATES PATENT OFFICE

ANDRÉ DUBONNET, OF NEUILLY-SUR-SEINE, FRANCE

SHOCK ABSORBING SUSPENSION

Application filed December 15, 1930, Serial No. 502,376, and in Belgium September 25, 1930.

The present invention relates to shock absorbing suspensions of the type described in the applicant's copending application Serial No. 415,510, filed Dec. 20, 1929.

One of the objects of the present invention is to provide means operative to progressively vary the braking action exerted by a shock absorbing assembly.

Another object is to provide means for adjusting the resistance of a shock absorbing assembly to any value desired.

Further objects will appear in the course of the detailed description now to be given with reference to the accompanying drawings, in which.

Figure 1:
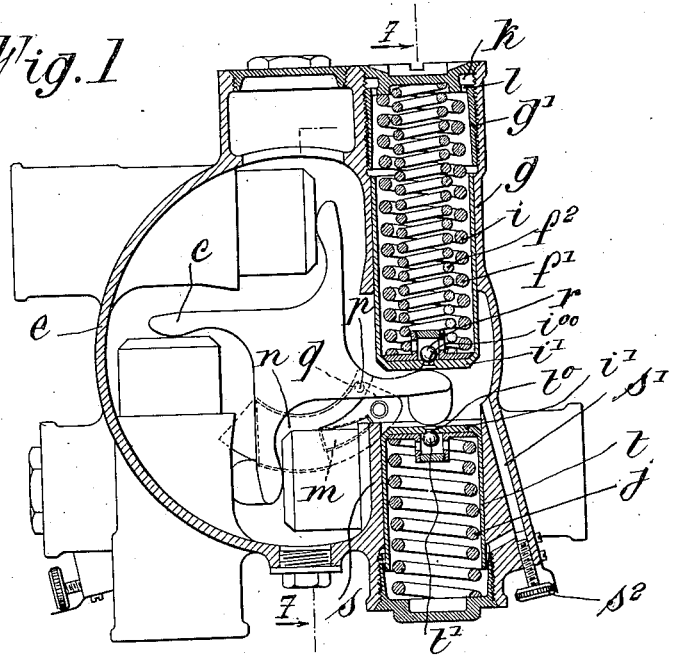
Fig. 1 is a side view, partially in section, of one constructive embodiment of the invention, the section being taken on line 5—5 of Fig. 3 to be described.
Figure 2:
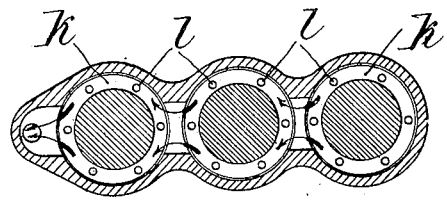
Fig. 2 is a section taken on the line 6—6 of Fig. 3.
Figure 3:
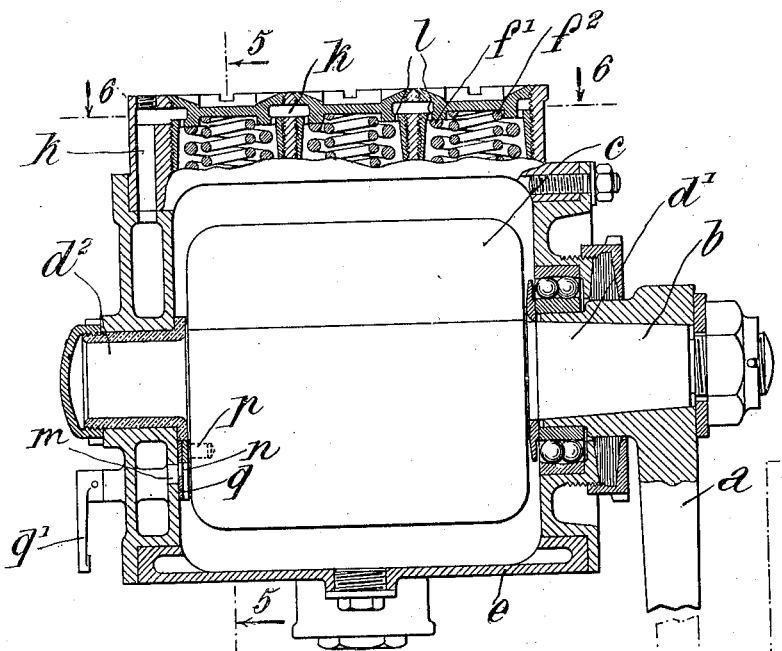
Fig. 3 represents the device shown in Figs. 1 and 2 as seen in the section taken on line 7—7 of Fig. 1.

Referring to the various figures of the drawings, there is shown an arm $a$ keyed at one extremity to a shaft $b$ and supporting a wheel at its other extremity. Shaft $b$ is supported in journals $d^1$, $d^2$, mounted in a casing $e$ supported on a vehicle chassis and adapted to contain oil or a similar fluid. A plurality of arms $c$ (preferably 4) are keyed to shaft $b$ and react at their extremities on opposed shock absorbing units. One of said shock absorbing units is composed of a cylinder $g$, threaded adjacent to one extremity thereof, a nipple $g^1$ threadedly engaging inside cylinder $g$ and provided with a passage or passages $l$ communicating with a recess $k$, the latter forming the wall of a conduit communcating at any appropriate point with the interior of casing $e$, a pair of concentric springs $f^1$ and $f^2$ mounted inside cylinder $g$ and reacting on a piston $i$ slidably contacting with the latter. and a ball valve $r$ controlling an orifice $i^{oo}$ formed in the end of piston $i$ and supported in a chamber having orifices formed therein communicating with the inside of piston $i$. The shock absorbing unit opposed to the one just described consists of a cylinder $s$ closed at one end by a threaded plug. a piston $t$ slidably mounted inside cylinder $s$ and having an orifice $t^o$ formed in the end thereof, said orifice being controlled by a ball valve $t^1$, a by-pass conduit $s^1$ communicating at opposite extremities with the inside of casing $e$ and the inside of cylnder $s$, a threaded element $s^2$ adapted to be screwed into conduit $s^1$ so as to vary the effective section thereof, and a spring $j$ tending to force piston $t$ into contact with arm $c$.

Means are provided for progressively varying the braking action exerted by the first of said shock absorbing units consisting of a port $m$ formed in casing $e$ and controlling communication between conduits $k$ and the interior of casing $e$, and a valve $n$ displaceable with shaft $b$ by pins $p$ connected to arm $c$.

Means are further provided for adjusting the braking action to any desired values by mounting a plate $q$ between orifice $m$ and valve $n$, the effective section of the passage provided by $m$ and $n$ being varied by rotation of an arm $q^1$ rigidly connected to element $q$ and capable of being controlled from the dashboard of the vehicle.

In the drawings, four pairs of opposed shock absorbing units have been shown reacting on arm $c$, each pair of units being positioned at right angles to those just adjacent. Obviously the number of such units may be increased at will.

The hereinabove described assembly functions in the following manner. Assuming that the wheel suspended from arm $a$ strikes a bump, the latter will rotate and communicate its movement to arms $c$ which will then move so as to displace pistons $i$ inward against the action of springs $f^1$ and $f^2$. The oil contained inside pistons $i$ and cylinders $g$ will, thereupon, react on ball valve $r$ so as to apply the latter forcibly against orifices $i^{oo}$. Oil will then flow via passages $l$ into conduits $k$ and back into casing $e$ via openings $m$. It will be noted, however, that as the displacement of arms $c$ continues, valves $n$ move across ports $m$ so as to diminish the effective section of the latter. The braking action exerted by the fluid circulating toward the inside of casing $e$, it will therefore be seen, gradually increases with the amplitude of the shock. Assemblies $s, t, j, t^1, s^1, s^2$ act to diminish the violence of the reaction of arms $c$. It will be noted that ball valve $t^1$ can only open when valve $r$ is in closed position and vice versa. Element $s^2$ merely serves to adjust the resistance offered by these assemblies. Similarly elements $q$ and $q^1$ serve to regulate the effects obtained by the coaction of elements $n$ and $m$.

Obviously, the invention is not limited to the use of such structures as $l, j, m, n$, for obtaining a progressive braking action. The same effects may be obtained by positioning passages $l$ and the walls of pistons $i$ so that the latter move across the mouths of the former so as to vary their effective section. Similarly piston $i$ and cylinder $g$ may be replaced by a collapsible chamber of any convenient form.

What I claim is:—

1. A structure of the class described comprising in combination a casing adapted to contain a fluid, an arm rotatably mounted inside said casing means operative to react on said arm to rotate the latter, a collapsible chamber positioned in contact with said arm, said chamber having an orifice in the wall thereof adapted to permit fluid to flow from said casing into said chamber, and a conduit extending from said collapsible chamber and communicating with the inside of said casing whereby fluid may flow from the inside of said casing through said orifice into said collapsible chamber and back to the inside of said casing via said conduit, and valve means operable by movement of said arm to vary the rate of flow of fluid through said conduit.

2. A structure of the class described comprising in combination a casing adapted to contain a fluid, an arm rotatably mounted inside said casing means operative to react on said arm to rotate the latter, a collapsible chamber positioned in contact with said arm, said chamber having an orifice in the wall thereof adapted to permit fluid to flow from said casing into said chamber, and a conduit extending from said collapsible chamber and communicating with the inside of said casing whereby fluid may flow from the inside of said casing through said orifice into said collapsible chamber and back to the inside of said casing via said conduit, means operable to regulate the rate of flow of fluid through said conduit, and valve means operable by said arm to vary the rate of flow of fluid through said conduit.

3. A structure of the class described comprising in combination a casing adapted to contain a fluid, an arm rotatably mounted inside said casing means operative to react on said arm to rotate the latter, a collapsible chamber positioned in contact with said arm, said chamber having an orifice in the wall thereof adapted to permit fluid to flow from said casing into said chamber, and a conduit extending from said collapsible chamber and communicating with the inside of said casing whereby fluid may flow from the inside of said casing through said orifice into said collapsible chamber and back to the inside of said casing via said conduit, and means operative to reduce the rate of flow of fluid through said conduit with increasing displacement of said arm.

4. A structure of the class described comprising in combination a casing adapted to contain a fluid, an arm rotatably mounted inside said casing means operative to react on said arm to rotate the latter, a collapsible chamber positioned in contact with said arm, said chamber having an orifice in the wall thereof adapted to permit fluid to flow from said casing into said chamber, and a conduit extending from said collapsible chamber and communicating with the inside of said casing whereby fluid may flow from the inside of said casing through said orifice into said collapsible chamber and back to the inside of said casing via said conduit, and valve means rigidly attached to said arm and displaceable to reduce the section of said conduit at the point where the latter communicates with said casing.

5. In a vehicle suspension, a chassis, a casing mounted on said chassis and adapted to contain a fluid, an arm rotatably mounted inside said casing, a second arm mounted outside of said casing and reacting on said first named arm, a wheel supported on said second arm, a collapsible chamber positioned in contact with said first named arm, said chamber having an orifice in the wall thereof adapted to permit fluid to flow from said casing into said chamber, a conduit extending from said collapsible chamber and communicating with the inside of said casing, whereby fluid may flow from the inside of said casing through said orifice into said collapsible chamber and back to the inside of said casing via said conduit, a second collapsible chamber mounted in opposition to said first named collapsible chamber and reacting on said arm, and means for varying the resistance offered by said second collapsible chamber to the movement of said arm.

6. In a vehicle suspension, a chassis, a casing mounted on said chassis and adapted to contain a fluid, an arm rotatably mounted inside said casing, a second arm mounted outside of said casing and reacting on said first named arm, a wheel supported on said second arm, a collapsible chamber positioned in contact with said first named arm, said chamber having an orifice in the wall thereof adapted to permit fluid to flow from said casing into said chamber, a conduit extending from said collapsible chamber and communicating with the inside of said casing, whereby fluid may flow from the inside of said casing through said orifice into said collapsible chamber and back to the inside of said casing via said conduit, a collapsible chamber mounted in opposition to said last named means and reacting on said arm, said collapsible chamber having an orifice formed in the wall thereof, and a conduit extending from said collapsible chamber and communicating with the inside of said casing, whereby fluid may flow from the inside of said casing, through said orifice into said collapsible chamber and back to the inside of said casing via said conduit.

7. In a vehicle suspension, a chassis, a casing mounted on said chassis and adapted to contain a fluid, an arm rotatably mounted inside said casing, a second arm mounted outside of said casing and reacting on said first named arm, a wheel supported on said second arm, a collapsible chamber positioned in contact with said first named arm, said chamber having an orifice in the wall thereof adapted to permit fluid to flow from said casing into said chamber, a conduit extending from said collapsible chamber and communicating with the inside of said casing, whereby fluid may flow from the inside of said casing through said orifice into said collapsible chamber and back to the inside of said casing via said conduit, a collapsible chamber mounted to oppose the action of said last named means and reacting on said arm, said collapsible chamber having an orifice formed in the wall thereof, a conduit extending from said collapsing chamber and communicating with the inside of said casing, and means for varying the rate of flow of fluid through said conduit.

8. In a vehicle suspension, a chassis, a casing mounted on said chassis and adapted to contain a fluid, an arm rotatably mounted inside said casing, a second arm mounted outside of said casing and reacting on said first named arm, a wheel supported on said second arm, a collapsible chamber positioned in contact with said first named arm, said chamber having an orifice in the wall thereof adapted to permit fluid to flow from said casing into said chamber, a conduit extending from said collapsible chamber and communicating with the inside of said casing, whereby fluid may flow from the inside of said casing through said orifice into said collapsible chamber and back to the inside of said casing via said conduit, a collapsible chamber mounted to oppose the action of said last named means and reacting on said arm, said collapsible chamber having an orifice formed in the wall thereof, a conduit extending from said collapsible chamber and communicating with the inside of said casing, a spring mounted inside said collapsible chamber and tending to resist diminution of the volume thereof, and a ball valve controlling said orifice.

9. In a vehicle suspension, a chassis, a casing mounted on said chassis and adapted to contain a fluid, an arm rotatably mounted inside said casing, a second arm mounted outside of said casing and reacting on said first named arm, a wheel supported on said second arm, a piston slidably mounted inside said casing and reacting on said first arm, said piston having an orifice formed therethrough, a conduit communicating at opposite extremities with the under side of said piston and with the inside of said casing, whereby fluid may flow from the inside of said casing, through said orifice to the under side of said piston, and back to the inside of said casing via said conduit, and valve means operable by said arm to vary the rate of flow of fluid through said conduit in accordance with the amplitude of displacement of said arm.

In testimony whereof I affix my signature.

ANDRÉ DUBONNET.